J. WATSON.
Steps and Step-Boxes.

No. 140,977.  Patented July 15, 1873.

Witnesses, J. S. Singer
Thomas McIlvain

Jas. Watson
by his Attys.
Townsend and Son

UNITED STATES PATENT OFFICE.

JAMES WATSON, OF PHILADELPHIA, PENNSYLVANIA.

IMPROVEMENT IN STEPS AND STEP-BOXES.

Specification forming part of Letters Patent No. 140,977, dated July 15, 1873; application filed May 5, 1873.

*To all whom it may concern:*

Figure 1:
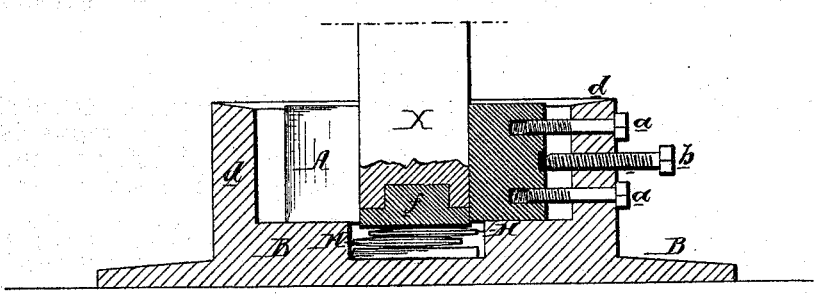
Figure 2:
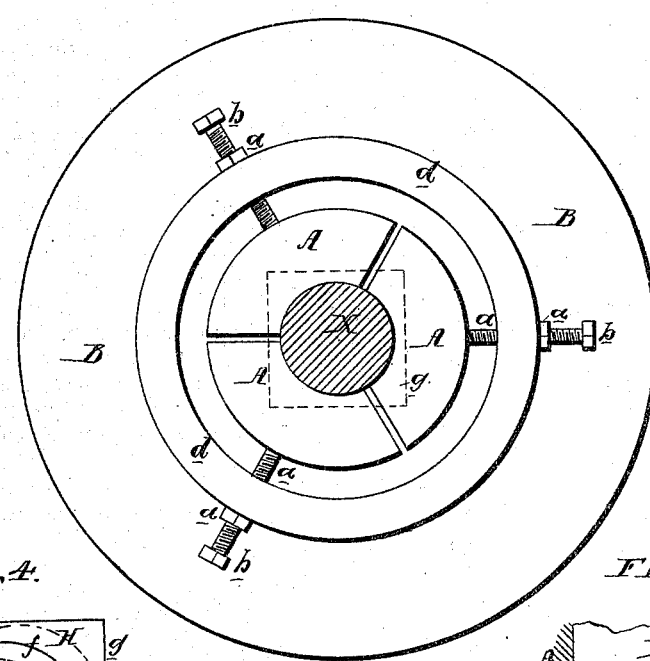

Be it known that I, JAMES WATSON, of Philadelphia, Pennsylvania, have invented an Improvement in Steps and Step-Boxes, of which the following is a specification:

The objects of my invention are to enable a mill or other spindle to be readily centered in a step-box, and the effects of wear taken up to reduce the friction and wear between the end of the spindle and step, and to insure a thorough and continuous lubrication of the parts. These objects I attain, first, by combining segmental bearing pieces A, shown in the vertical section, Figure 1, and plan view, Fig. 2, of the accompanying drawing, with the end X of the spindle and step-box B, and rendering the said bearings adjustable by means of two sets of screws, $a$ and $b$; second, by combining with and interposing between the end of the spindle and step-box two or more slightly rounded anti-friction disks, H H, arranged to have a limited lateral play, as shown in the detached views, Figs. 3 and 4, so that the points of wear may be constantly shifted; and, third, by so constructing the step-box B with a continuous flange, $d$, for the reception and passage of the adjusting-screws, that a chamber defined by the said flange shall be formed within the box, and serve the twofold purpose of a receptacle for the end of the spindle and its bearings, and as a reservoir for lubricating material. The portions of the set-screws $a$ which pass through the flange $d$ of the step-box are plain, and their threaded ends are adapted to correspondingly-threaded recesses in the segmental bearing pieces A, while the set-screws $b$ simply bear against the latter and are adapted to screw-threads cut in the flange $d$. In adjusting the bearings, therefore, they are moved by means of the screws $a$, and retained in the required position after adjustment by means of the screws $b$, which are forced against them.

The whole of the segmental bearing pieces can be moved in any one given direction for the purpose of centering the spindle; or can be adjusted independently towards the latter for the purpose of taking up the effects of wear. This is an important feature of my invention.

Figure 4:
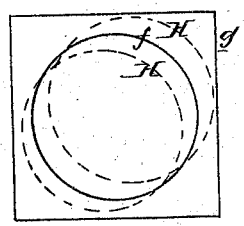
Figure 3:
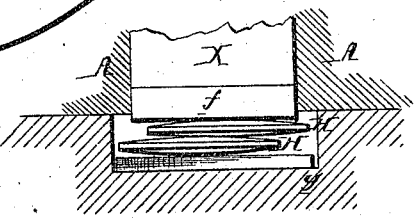

Instead of reducing the step end of the spindle, as usual, I permit it to remain of the full diameter, and secure to its extreme end a steel shoe, $f$, which can be removed and replaced by a new one when worn away. Between this steel shoe and a steel plate, $g$, let into the step-box, I interpose two more slightly-rounded anti-friction disks, H; but instead of confining the latter, as usual, I permit them to have a limited lateral play, as shown in Figs. 3 and 4, so that as the spindle revolves the said disks will constantly change their relative positions, and, by thus shifting the points of wear, will remain effective for a long time.

The chamber within the step-box, defined by the flange $d$, may be filled to the top with lubricating material, thus submerging the whole of the operative parts, and reducing the friction to a minimum.

I claim as my invention—

1. The combination, with a spindle, of a series of disks, H H, arranged below the end of the spindle, and capable of a limited lateral motion, substantially as and for the purpose set forth.

2. The combination, with the segmental bearing-pieces A, of the retaining-screws $a$ $a$ and set-screws $b$, as specified.

3. The step-box B, closed at the bottom, and adapted to receive the adjustable segmental blocks A A and disks H H, substantially as described.

In testimony whereof I have signed my name to this specification in the presence of two subscribing witnesses.

JAMES WATSON.

Witnesses:
WM. A. STEEL,
HUBERT HOWSON.